Feb. 27, 1934.  F. X. LAUTERBUR ET AL  1,949,105
DOUGH WORKING MACHINE
Filed March 6, 1931  2 Sheets-Sheet 1

INVENTORS
Frank X. Lauterbur
Edward J. Lauterbur
BY Allen & Allen
ATTORNEYS.

Feb. 27, 1934.   F. X. LAUTERBUR ET AL   1,949,105
DOUGH WORKING MACHINE
Filed March 6, 1931   2 Sheets-Sheet 2
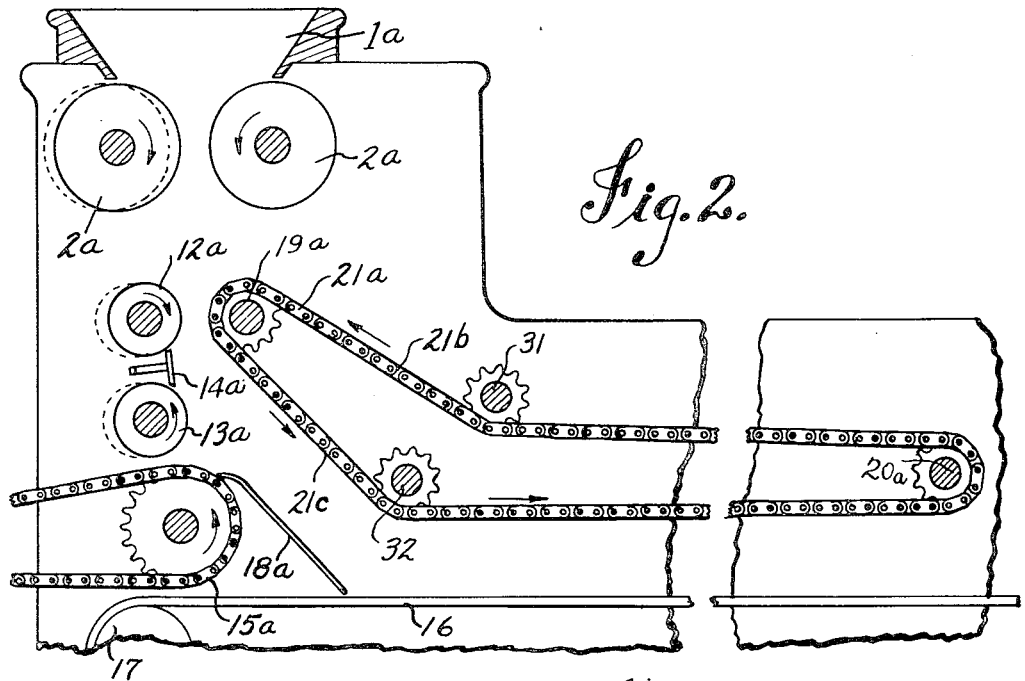
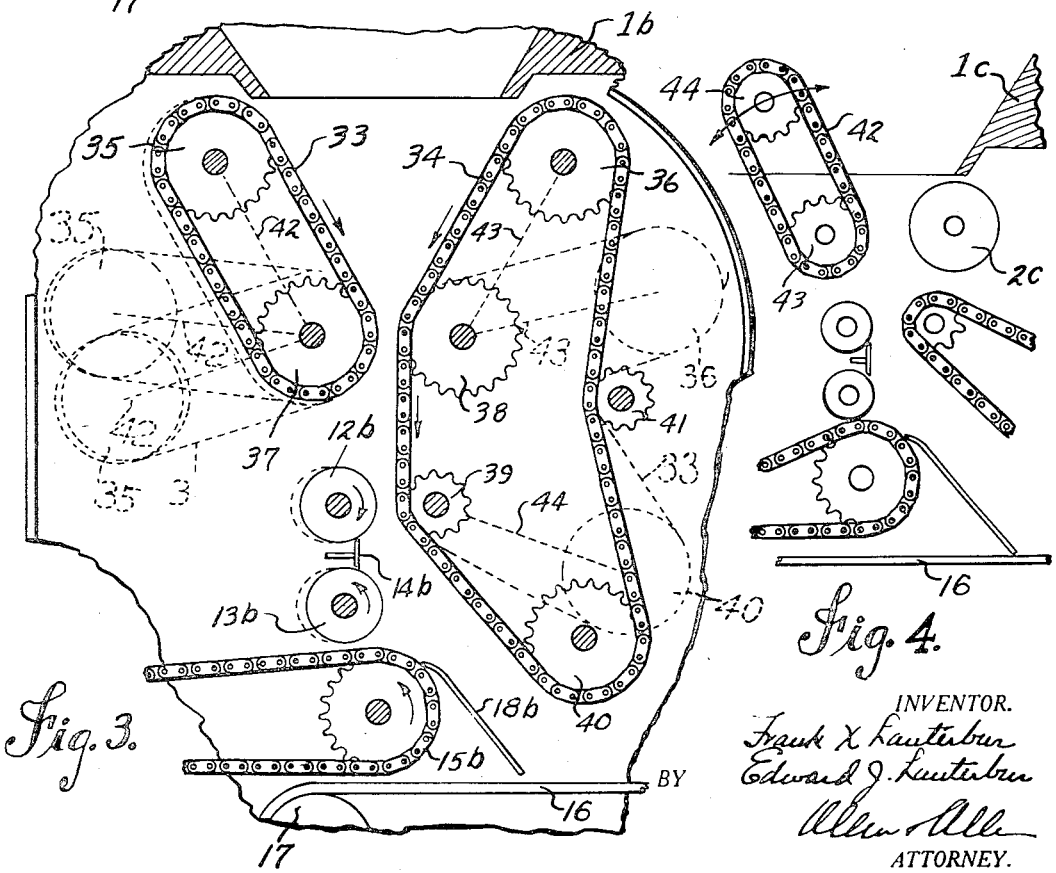
INVENTOR.
Frank X Lauterbur
Edward J. Lauterbur
ATTORNEY.

Patented Feb. 27, 1934

1,949,105

UNITED STATES PATENT OFFICE 1,949,105

DOUGH WORKING MACHINE

Frank X. Lauterbur and Edward J. Lauterbur, Sidney, Ohio; Wilhelmina S. Lauterbur and Leo V. Lauterbur executors of said Frank X. Lauterbur, deceased.

Application March 6, 1931, Serial No. 520,511

11 Claims. (Cl. 107—9)

Our invention relates to dough working and molding machines, exemplified in the prior patents granted Jan. 4, 1916 #1,167,187, Jan. 18, 1921—#1,366,266, Oct. 24, 1922—#1,432,874, May 5, 1925—#1,536,224 and May 5, 1925—#1,537,018, to which the present invention is applicable.

The present invention relates more especially to the apparatus for working of the dough and flattening and initially curling the flattened dough preliminary to the rolling loaf molding operation of such a machine.

An object of the present invention is to afford a more thorough homogeneity of the dough, eliminating as much as possible, the voids due to the action of gases formed in the making of the dough, with the object of having a better texture of the bread, as well as better insuring uniform weight of the loaves of uniform size.

Further objects are to provide a more positive conveying and working action on the dough; to permit a slower speed to be used while avoiding sticking of the dough to the working parts of the machine contacting therewith; to reduce sweating of the dough while being worked; and to prevent, as far as possible, the absorption of moisture by the dough during such working.

A further object is to provide more extensive adjustment of the feeding mechanism by which the dough is taken from a hopper and flattened and elongated and fed to the curling device, as well as to improve the operation of this curling device which starts the curling of the strip of dough as it enters the final molding device of the machine.

To the accomplishment of the said above and related ends, said invention, then consists in the construction and novel combination of parts hereinafter fully described, illustrated in the accompanying drawings, and particularly pointed out in the claims hereto appended; it being understood that various changes in the form, proportion, size and minor details of construction, within the scope of the claims, may be resorted to without departing from the spirit or sacrificing any of the advantages of the invention.

Referring to the drawings:

Figure 2 is a partial vertical longitudinal section of a machine embodying a modification of the invention.

Figure 3 is a similar view showing a further modification of the invention.

Figure 4 is a similar view showing a still further modification of the invention.

Figure 1:
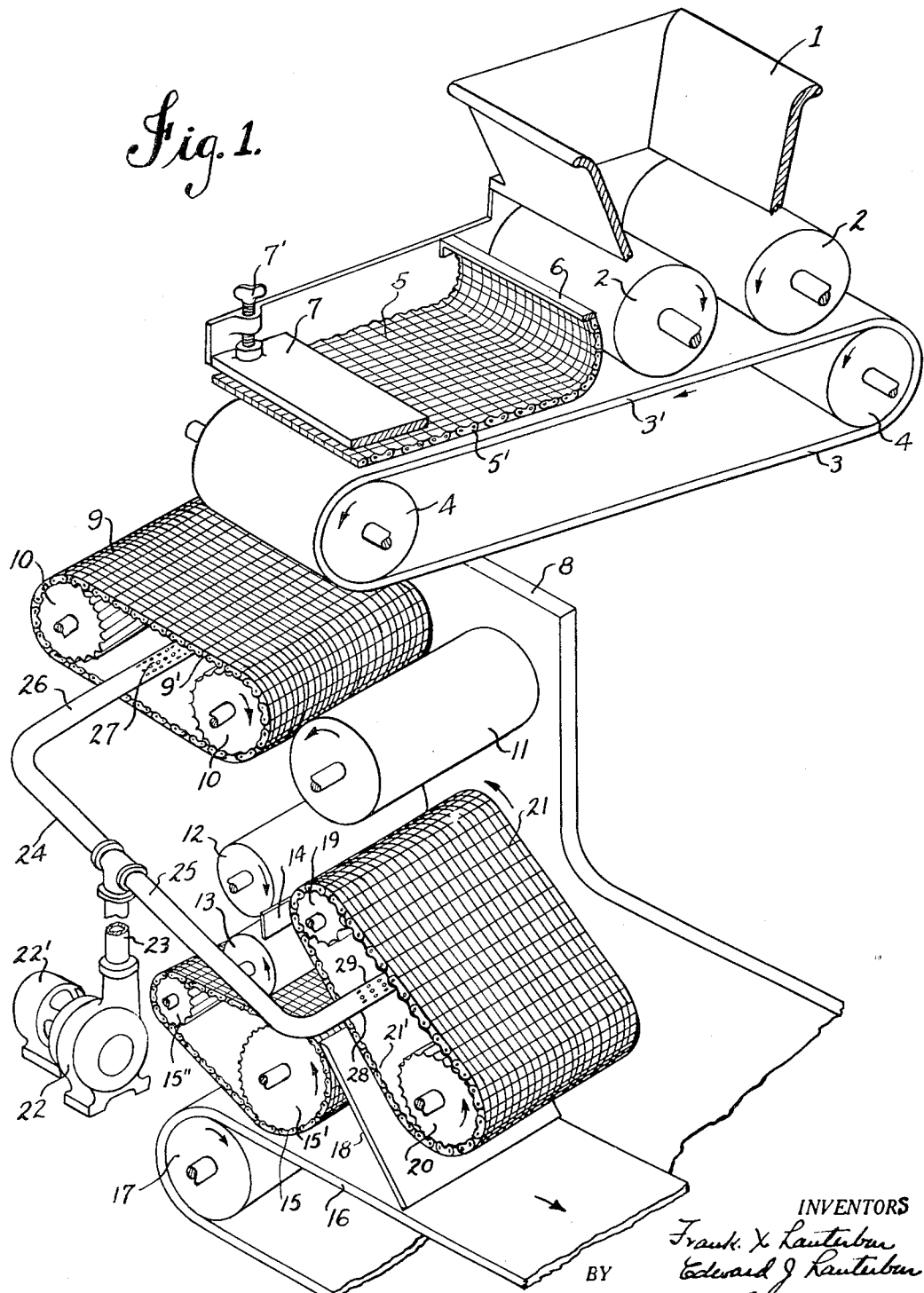
Figure 1 is a diagrammatic perspective view of a preferred embodiment of the invention.

In the device shown in Figure 1, there is a hopper 1 under the open bottom of which two rolls 2 rotate over and downwardly toward each other; these rolls 2 being adjustable as to distance between each other and being spaced up from one end part of a conveyor comprising an endless flexible conveyor belt 3 passing around rolls 4 and running out from under the rolls 2. Over this conveyor 3 is a chain web 5 with its end next to the hopper 1 fixed to a bar 6 somewhat up from the belt 3. This web 5 covering the major outer portion of the conveyor 3, with its outer end loose, close to the outer end of the conveyor 3. A pressure plate 7 is mounted across the loose outer end of this chain web 5, this plate 7 being adjustable up and down to limit movement of the chain web 5 more or less closely above the conveyor 3. The arrow indicates the direction of the upper stretch 3' of the conveyor, and the lower stretch 5' of the upper chain web is pulled in the same direction, from the hopper 1 and rolls 2 out to this last mentioned end of the conveyor.

This end of the conveyor extends in across one side of the machine frame 8 over a lower endless web 9 which runs around rolls 10 in a direction at right angles to the direction of running of the conveyor belt 3. At the delivery end of this lower chain belt device is a roll 11, space a desired distance away from the adjacent end of the chain web device; and below the space between this device and this roll 11 are two rolls 12 and 13, one above the other. The upper roll 11 rotates over and downward toward the downwardly running end of the chain web 9, the upper one 12 of the two lower rolls rotates in the direction of the chain belt rolls 10 and the lower one 13 of these two rolls rotates in the opposite direction, and these two rolls 12 and 13 have a scraper plate 14 between and against them at the side where they rotate toward each other. Below these rolls 12 and 13 is the endless chain web 15 passing around rolls 15' and 15'' rotating in the same direction as the lower one 13 of the two rolls, and being over the conveyor belt 16, which will be understood to be endless and running around two rolls, one of which, 17 is shown; the direction of travel of the upper stretch of this belt 16 being the same as that of the upper stretch of the chain web 9. A plate 18 inclines down from the chain web 15 on to this upper stretch of the belt 16 in the direction of travel of the belt 16, acting as a scraper and guide. This belt 16 will be understood to be the conveying element of a loaf-forming device wherein the traveling belt rolls the curled mass of dough along an overlying pressure board and between sides laterally confining the dough, thereby forming loaves of cylindrical or modified cylindrical shapes, as is known in the art, especially as disclosed in the prior patents above mentioned. Also that much of the device comprising the rolls 12 and 13, web 15, and plates 14 and 18 is part of the preliminary curling mechanism, here having chain web 15 instead of a roll. Such mechanism also has been provided with an endless web having a stretch running from the upper roll 12 down along the series of rolls and out over the plate 18, being spaced out from these parts, and forming the outer wall of the passage and coacting with the rolls and plate 18 to effect the curling operation. In the present invention this web is provided as just described, running around an upper roll 19, and a larger lower roll 20; but instead of being an ordinary belt, it is a chain web 21, similar to the other chain webs 5, 9 and 15 of the present invention, as hereinbefore described.

It will be understood that the various rolls in practice are provided with suitable gears for driving them in the appropriate directions as described. Such driving mechanism being mostly found in the prior art patents mentioned, or easily understood by those skilled in machine design, is not deemed necessary to illustrate such driving means herein. Also it will be understood that the various rolls and belts and webs may be adjusted greater or less distances apart by means equally well known in the art.

A blower 22 has its outlet pipe 23 provided with branches 24 and 25; the branch 24 having a terminal nozzle 26 running in between the upper and lower stretches of the intermediate chain web 9, with perforations 27 directed upward toward the lower side of the upper stretch 9' of the web 9. The other branch 25 has the terminal nozzle 28 running in between the upper and lower stretches of the curling chain web 21 with outlet perforations 29 directed toward the lower stretch 21' of this chain web 21. This blower 22 driven, for instance, by an electric motor 22', forces air out through the perforations 27 and 29 and through the interstices of the pervious or reticulated webs 9 and 21, against the dough which they carry or make contact with.

When the mass of dough, flattened, elongated and curled between the belt stretch 3' and chain web stretch 5' held down by the pressure plate 7, is delivered on to the upper stretch 9' of the chain web 9 and thus carried sidewise in a direction at right angles to the direction in which it has just been flattened and elongated, it settles into folds on this web 9 and is carried down between this web 9 and the roll 11, thereby being flattened and elongated in a direction at a substantial angle to that of its preceding flattening and elongation; so that any voids which may exist after the first rolling as in machines of this kind heretofore constructed, will be attacked from a different angle with a much greater chance that the dough will be thoroughly compacted so as to eliminate such voids. Of course, in the light of what has been described, the machine can be made with additional conveying webs working at substantial angles to each other, if this is found desirable to still more thoroughly accomplish such results.

The chain belts 5, 9, 15 and 21 preferably are made up of parallel series of sprocket chains as indicated; although it will be understood that other kinds of reticulated web structures may be employed; the principal requirement being that they shall be strong enough to support or press the dough properly and present to the dough instead of a continuous substantially plane surface, a series of very narrow surfaces to which the dough cannot so readily adhere. It is in this sense that these webs are described as reticulated; and also, as a reticulated structure is pervious, then any such reticulated structure other than the particular one set forth herein answers to the purpose of forcing a gaseous medium against the dough where it contacts with the supporting or pressing web. It is in respect of this latter utility that the web is essentially pervious, and it will answer to this latter requirement without being reticulated. That is, it might be some structure other than chain, so long as it allows free passage of the gaseous medium against the dough thereon. The preferred gaseous medium is reasonably dry air; the purpose of such medium being to aid in the function of the narrow contact surfaces of the web to minimize sticking of the dough to the web. In this respect the dryness of the medium is not so essential; but in respect of another function of this medium, that of minimizing sweating of the dough and the absorption of moisture by the dough dryness is one of its desirable properties. The best results are accomplished by the utilization of all of these properties of the webs and of the gaseous medium used therewith, but we are not to be understood as being limited to the use of all of these properties. The extent to which these several advantages are utilized in a particular machine or at any given time in the operation of a machine is dependent upon the difficulties encountered with a particular dough or the results desired in the final product.

In Figure 2 we give an example of the use of such a chain web as a part of the curling device, in modified form whereby the endless web 21a, in addition to passing around terminal rolls 19a and 20a, has its upper stretch 21b and its lower stretch 21c passing under rolls 30 and 31 respectively, so located that a part of this web device inclines down along and cooperates with the curling rolls 12a and 13a with their scraper 14a and chain web 15a, and the plate 18a, as in the previous example; while the other end part runs along over the conveyor web 16 to the loaf-forming device hereinbefore referred to. This latter part of the chain web device thus amounts to an extension affording the advantages before described, with respect to preventing sticking and sweating of the dough and absorption of moisture thereby; continuing this care of the dough through a further stage of the curling and rudimentary forming operation on the dough. In this example the dough is taken from the hopper 1a, flattened and elongated and delivered to the curling device, between two rolls 2a acting the same as the rolls 2 of the preceding example; but it will be understood that the device for working of the dough in successive different directions as in the preceding example, may be interposed between the rolls 2a and the curling device of Figure 2. Also it will be understood that the reticulated web 21a may have the blowing device applied to it as in the preceding example.

In Figure 3, two chain webs 33 and 34 pass around rolls 35 and 36 located at opposite sides of the outlet of the hopper 1b, partly shown. One web 33 is shorter than the other web 34 and merely passes around the lower roll 37. The other web passes over a lower roll 38, and partly around a smaller lower roll 39 and then under and up around the bottom terminal roll 40, and has an idler roll 41 bearing against its outer side where it passes from this lower roll 40 up to the top roll 36. In its downward stretch past the other shorter web 33, this web 34 faces and cooperates with the curling rolls 12b, 13b, and a scraper 14b and the web 15b and its plate 18b, delivering to the conveyor belt 16, which carries the dough for the subsequent loaf molding operation.

As indicated by the dotted lines in Figure 3, the upper roll 35 is mounted on a spacing arm 42 which swings co-axially with the lower roll 37, so that the shorter chain web 33 may be swung downwardly and outwardly from the adjacent side of the exit of the hopper 1b. Likewise, the upper roll 36 of the other web 34 is on spacing arm 43 swinging coaxially with the next lower guiding roll 38 of this web, so that this web 34 may be swung downwardly and outwardly from the other side of the hopper exit. Also the bottom roll 40 of this longer web 34 is carried on a spacing arm 44 swinging coaxially with the lower smaller guiding roll 39 of this web, to swing up away from the lower ones of the curling elements with which this web coacts. Thus the stretches of the webs 33 and 34 that face each other may be converged more or less in their extent downward from the hopper 1b to afford a more or less gradual compression of the dough at the beginning of the flattening and elongating operation thereof; and at the bottom the longer web may be more or less inclined away from the other curling elements in accordance with the variations in diameters of loaves being made, or with the amount of compression desired to be imparted to the dough in the initial stages of its curling as it is passing to the loaf molding part of the machine.

The webs 33 and 34 are shown and described as chain webs, with the advantages of their reticulation pointed out for the webs in the preceding examples; and it will be understood that the blowing means may be used with either one or both of these webs 33 and 34 with the results before pointed out from the use of such means. Also it will be understood that while the converging webs 33 and 34 here act directly from the hopper 1b, the device for acting on the dough successively in different directions, of Figure 1, is applicable between the hopper 1b and these webs 33 and 34.

In Figure 4 an endless chain web 42 runs around sprocket rolls 43 and 44, the latter roll being in the hopper 1c so as to form one of the converging walls of the hopper, whereby the positive feeding action of the reticulated web 42 is used in drawing the material down from the hopper between this web 42 and the roll 43 and a roll 2c below the hopper and corresponding to the roll 2 of Figure 1 or the roll 2a of Figure 2. The curling mechanism is shown in this example the same as in Figure 1 and the parts are numbered correspondingly, as also is the conveyor 16 which receives the material from this curling mechanism.

Wherever the webs are of sprocket chain or the like, as described, the rolls therefor have appropriate sprocket teeth or corrugations to engage the webs positively; and another one of the advantages of having the webs 5, 9, 21, 21b, 33 or 34 of chain structure, or reticulated, is a more positive driving action in conveying and controlling the direction travel of the dough; since the multiple narrow surfaces of such a web, although having the non-sticking properties before described, have more concentrated pressures on the dough than mere plane webs. It will be understood, however, that, in respect of the novel pressing, conveying and successive working functions of the webs as herein disclosed, reticulation or perviousness are not essential properties of the various webs.

Having thus described our invention, what we claim as new and desire to secure by Letters Patent, is:

1. In a dough working machine, mechanism for preparing a continuous sheet of dough comprising, a moving member for compressing the dough as a part of the working operation, said member being pervious for the purposes described, and means for forcing a gaseous medium through the pervious member and out past the contacting surface of said member.

2. In a dough working machine, mechanism for preparing a continuous sheet of dough comprising, a conditioning device comprising means to repeatedly elongate a mass of dough, each time in a direction at a substantial angle to that of the previous elongation, and a dough curling device in receiving relation to said conditioning device, each device comprising a pervious moving member making contact with the dough, and forcing means for forcing a gaseous medium, said forcing means having outlets at the respective pervious members.

3. In a dough working machine, a pervious moving wall and curling means facing each other, said wall contacting with the dough to hold it to said curling means, and means for forcing a gaseous medium through the pervious wall and out past the contacting surface of said wall.

4. In a dough working machine, devices successively acting upon a mass of dough, to repeatedly elongate and curl the mass, the action of each device being such with relation to another one of said devices that each elongation and curling is in a direction at a substantial angle to that of the next preceding elongation and curling, each one of said devices comprising a pervious member movably contacting with the dough.

5. In a dough working machine, dough-curling means, means for feeding dough to said curling means, and means for receiving dough from said curling means for further operation on the dough, said curling means comprising a plurality of pervious curling members facing each other and having a materially non-parallel relative movement whereby passage of dough between said members causes curling of the dough during said passage without material flattening of the dough.

6. In a dough working machine, dough-curling means, means for feeding dough to said curling means, and means for receiving dough from said curling means for further operation on the dough, said curling means comprising pervious moving members acting on the dough in non-parallel and opposite directions.

7. In a dough working machine, dough-curling means, means for feeding dough to said curling means, and means for receiving dough from said curling means for further operation on the dough, said curling means comprising pervious moving members acting on the dough in non-parallel and opposite directions, and the resultant of their combined action being at a substantial angle to the horizontal.

8. In a dough working machine, an upper mechanism for flattening and curling a piece of dough by passage of the dough in a certain direction, and a second mechanism under and in receiving relation to the upper mechanism receiving the curled dough and carrying said curled dough at a substantial angle to the travel of the dough in the upper mechanism, said lower mechanism comprising means arranged in a series extending downwardly from the upper mechanism for flattening and curling said dough while the dough is traveling continuously downwardly in the latter direction.

9. In a dough working machine, an upper conveyor, dough flattening means delivering to said conveyor, curling means coacting with said conveyor to curl the flattened dough, a second conveyor under and in relation to said upper conveyor to receive the material directly and continuously downwardly therefrom, and running in a direction at a substantial angle to the direction of running of the upper conveyor, a second dough flattening means coacting downwardly with said second conveyor, and second dough curling means receiving the flattened dough downwardly from said second dough flattening means.

10. The method of working dough which comprises contacting the dough with pervious means while applying to said dough through said pervious means a gaseous medium, and pressing the dough into forcible contact with said pervious means, said gaseous medium being adapted to minimize sweating of the dough.

11. The method of working dough which comprises contacting the dough with pervious means while applying to said dough through said pervious means a gaseous medium, and pressing the dough into forcible contact with said pervious means, said gaseous medium being adapted to minimize absorption of moisture by the dough.

FRANK X. LAUTERBUR.
EDWARD J. LAUTERBUR.